(12) United States Patent
Rangarajan et al.

(10) Patent No.: US 7,225,284 B2
(45) Date of Patent: May 29, 2007

(54) INCREASING THE QUANTITY OF I/O DECODE RANGES USING SMI TRAPS

(75) Inventors: Madhusudhan Rangarajan, Round Rock, TX (US); Saurabh Gupta, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 173 days.

(21) Appl. No.: 10/909,657

(22) Filed: Aug. 2, 2004

(65) Prior Publication Data

US 2006/0026321 A1  Feb. 2, 2006

(51) Int. Cl.
G06F 13/00 (2006.01)
G06F 13/24 (2006.01)
G06F 13/36 (2006.01)
G06F 13/12 (2006.01)

(52) U.S. Cl. .................. 710/266; 310/261; 310/266; 310/119; 310/314; 310/104; 310/311; 310/317; 310/269; 713/1; 713/2; 711/114; 711/145; 717/166

(58) Field of Classification Search ............. None
See application file for complete search history.

(56) References Cited

U.S. PATENT DOCUMENTS

| | | | |
|---|---|---|---|
| 5,712,761 A | 1/1998 | Dials et al. | 361/685 |
| 5,764,479 A | 6/1998 | Crump et al. | 361/685 |
| 5,764,480 A | 6/1998 | Crump et al. | 361/685 |
| 5,878,271 A | 3/1999 | Crump et al. | 395/821 |
| 5,898,843 A | 4/1999 | Crump et al. | 395/280 |
| 5,915,100 A | 6/1999 | Crump et al. | 395/281 |
| 5,948,092 A | 9/1999 | Crump et al. | 710/129 |
| 6,049,852 A * | 4/2000 | Oba et al. | 711/145 |
| 6,131,131 A | 10/2000 | Bassman et al. | 710/15 |
| 6,199,134 B1* | 3/2001 | Deschepper et al. | 710/311 |
| 6,230,227 B1* | 5/2001 | Fry et al. | 710/314 |
| 6,324,609 B1* | 11/2001 | Davis et al. | 710/119 |
| 6,336,158 B1* | 1/2002 | Martwick | 710/104 |
| 6,418,498 B1* | 7/2002 | Martwick | 710/269 |
| 6,421,754 B1* | 7/2002 | Kau et al. | 710/261 |
| 6,477,642 B1* | 11/2002 | Lupo | 713/2 |
| 6,715,023 B1* | 3/2004 | Abu-Lebdeh et al. | 710/317 |
| 6,968,412 B1* | 11/2005 | Nalawadi | 710/261 |
| 7,017,035 B2* | 3/2006 | Nalawadi et al. | 713/1 |
| 2006/0047876 A1* | 3/2006 | Stultz | 710/260 |
| 2006/0085580 A1* | 4/2006 | Gupta et al. | 710/260 |
| 2006/0143505 A1* | 6/2006 | Olarig et al. | 714/6 |
| 2006/0149900 A1* | 7/2006 | Terry et al. | 711/114 |
| 2006/0168576 A1* | 7/2006 | Phung et al. | 717/168 |

\* cited by examiner

*Primary Examiner*—Paul R. Myers
*Assistant Examiner*—Brian Misiura
(74) *Attorney, Agent, or Firm*—Baker Botts L.L.P.

(57) ABSTRACT

A method of increasing the quantity of input/output (I/O) decode ranges using system management interrupts (SMI) traps is disclosed. In one aspect, the present disclosure teaches a method of increasing the quantity of I/O decode ranges using SMI traps in a chipset including generating a system management interrupt (SMI) based on information causing access to an I/O address that triggers a SMI trap. The I/O address operably received at the chipset via a bus. The method further including automatically reprogramming a decode register in the chipset such that the I/O address forwards the information to a device on the bus.

17 Claims, 2 Drawing Sheets

INCREASING THE QUANTITY OF I/O DECODE RANGES USING SMI TRAPS

TECHNICAL FIELD

The present disclosure relates generally to information handling systems and, more particularly, to increasing the quantity of I/O decode ranges using system management interrupts (SMI) traps.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems generally include a chipset architecture. The chipset architecture is designed to allow one or more chips, typically a group of integrated circuits, to perform related functions. In one chipset architecture, two chips referred to as a Northbridge chipset and a Southbridge chipset are used to perform these functions.

In a typically Northbridge/Southbridge chipset arrangement, the Northbridge chipset is used to connect a processor to computer memory via the front side bus wherein graphic, peripheral component interconnections (PCI) and level 2 cache functions are performed. The Southbridge chipset controls the input/output (I/O) functions for the system including universal serial bus, system's basic I/O systems (BIOS), interrupt controller and an industry standard architecture (ISA) bus. Because the Southbridge chipset controls the I/O functions, the Southbridge chipset may include an I/O controller hub.

I/O controller hubs receive and direct information between I/O devices via a bus. In order to direct the information to the device, the information including an I/O address or I/O access stored in an I/O range that is must be decoded at the chipset to determine where to send the information. Generally, the I/O range is decoded either positively or subtractively.

Using positive decoding, a distinct I/O range is programmed in the chipset to route all information to a particular device via a particular bus based on the distinct I/O range. However, many chipsets can only program or store a limited number of distinct I/O ranges. Thus, under subtractive decoding, any I/O ranges that are not programmed in the chipset will be automatically forwarded to the bus in a broadcast fashion.

In some instances, a chipset only permits the programming of two distinct I/O decode ranges and only uses positive decoding such that the chipset requires a distinct I/O decode range for each device. However, some devices that reside on the bus typically require a distinct range for full functionality such as Super I/O controller, baseboard management controller (BMC), complex programmable logic device (CPLD), and SmartVu cards. Therefore, all four devices are requiring a distinct I/O range but only two are available.

SUMMARY

Thus, a need has arisen for increasing the quantity of input/output (I/O) decode ranges using system management interrupt (SMI) traps.

In accordance with teachings of the present disclosure, in one embodiment, a method of increasing the quantity of input/output (I/O) decode ranges in a chipset including generating a system management interrupt (SMI) based on information causing access to an I/O address that triggers a SMI trap. The I/O address operably received at the chipset via a bus. The method further including automatically reprogramming a decode register in the chipset such that the I/O address forwards the information to a device on the bus.

In other embodiments, an information handling system including a processor and memory operably coupled to the processor. The information handling system further includes a chipset communicatively coupled to the processor and the memory such that the chipset operably receives input/output (I/O) address from the processor via a bus. The chipset including a decode register having at least one decode range. The decode range operable to route information to a computer device associated with the decode range. The information handling system further including a stored decode register communicatively coupled to the chipset. The stored decode register operably stores an I/O address. The information handling system further including a system management interrupt (SMI) trap operably set to generate a SMI. Whereby during the SMI, a SMI handler reprograms the decode register to include at least one of the I/O addresses to allow the information to be forwarded to the respective computer device on the bus.

In further embodiments, a computer-readable medium having computer-executable instructions for performing a method of increasing the quantity of input/output (I/O) decode ranges includes programming a system management interrupt (SMI) trap in a basic I/O system (BIOS) to generate a SMI. The SMI trap operably triggered from information accessing an I/O address. The method further includes, upon generation of the SMI, saving a current value of a decode range register in memory and deactivating the SMI trap. The method further includes automatically reprogramming a decode range register to include the I/O address. The method further includes, following the reprogramming of the decode range register, resending the information accessing the I/O address and restoring the decode range register to the current value. The method further includes re-activating the SMI trap.

In one aspect, teachings of the present disclosure provide the technical advantage of programming decode ranges for additional registers in a chipset. Low pin count (LPC) buses that positively decoded typically require distinct I/O ranges for each device on the bus. By storing additional registers in temporary memory, a SMI trap can be used to reprogram certain ranges to direct information to the appropriate device.

In another aspect, teachings of the present disclosure provide the technical advantage of attaining debug information from various devices on a bus. Because the decode ranges are programmable upon entry into a SMI, debug codes may be broadcast on multiple buses to multiple devices. Based on receipt of the debug code at particular devices on the bus, debug information may be obtained to troubleshoot problems.

All, some, or none of these technical advantages may be present in various embodiments of the present invention. Other technical advantages will be apparent to one skilled in the art from the following figures, descriptions, and claims.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 4, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
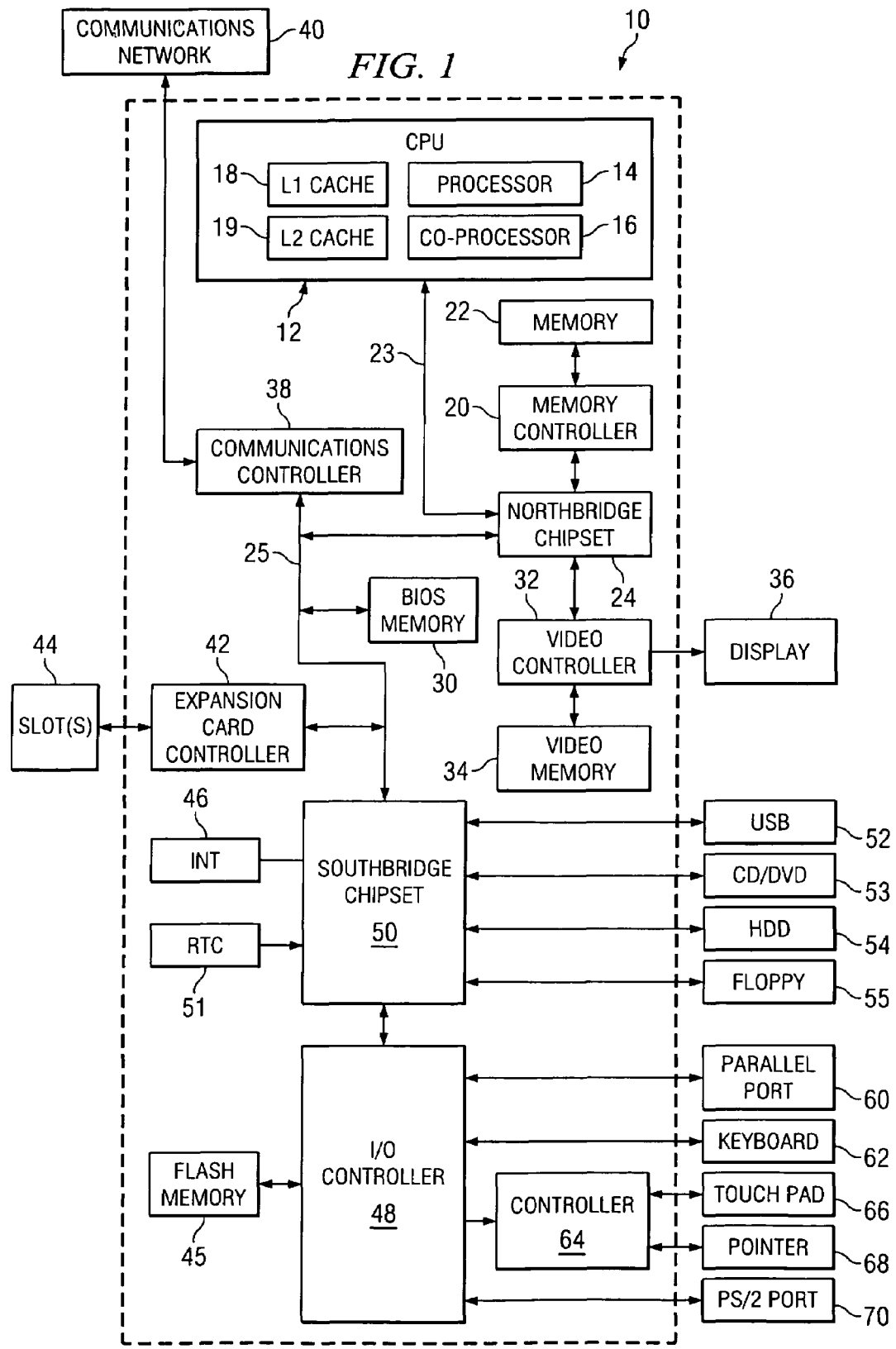
FIG. 1 is a block diagram showing an information handling system, according to teachings of the present disclosure.

Referring first to FIG. 1, a block diagram of information handling system 10 is shown, according to teachings of the present disclosure. Information handling system 10 or computer system preferably includes one or more microprocessors such as central processing unit (CPU) 12. CPU 12 may include processor 14 for handling integer operations and coprocessor 16 for handling floating point operations. CPU 12 is preferably coupled to cache, such as L1 cache 18 and L2 cache 19 and a chipset, commonly referred to as Northbridge chipset 24, via a frontside bus 23. Northbridge chipset 24 preferably couples CPU 12 to memory 22 via memory controller 20. Main memory 22 of dynamic random access memory (DRAM) modules may be divided into one or more areas such as system management mode (SMM) memory area (not expressly shown).

Graphics controller 32 is preferably coupled to Northbridge chipset 24 and to video memory 34. Video memory 34 is preferably operable to store information to be displayed on one or more display panels 36. Display panel 36 may be an active matrix or passive matrix liquid crystal display (LCD), a cathode ray tube (CRT) display or other display technology. In selected applications, uses or instances, graphics controller 32 may also be coupled to an integrated display, such as in a portable information handling system implementation.

Northbridge chipset 24 serves as a "bridge" between CPU bus 23 and the connected buses. Generally, when going from one bus to another bus, a bridge is needed to provide the translation or redirection to the correct bus. Typically, each bus uses its own set of protocols or rules to define the transfer of data or information along the bus, commonly referred to as the bus architecture. To prevent communication problem from arising between buses, chipsets such as Northbridge chipset 24 and Southbridge chipset 50, are able to translate and coordinate the exchange of information between the various buses and/or devices that communicate through their respective bridge.

Basic input/output system (BIOS) memory 30 is also preferably coupled to PCI bus 25 connecting to Southbridge chipset 50. FLASH memory or other reprogrammable, non-volatile memory may be used as BIOS memory 30. A BIOS program (not expressly shown) is typically stored in BIOS memory 30. The BIOS program preferably includes software which facilitates interaction with and between information handling system 10 devices such as a keyboard 62, a mouse such as touch pad 66 or pointer 68, or one or more I/O devices. BIOS memory 30 may also store system code (note expressly shown) operable to control a plurality of basic information handling system 10 operations.

Communication controller 38 is preferably provided and enables information handling system 10 to communicate with communication network 40, e.g., an Ethernet network. Communication network 40 may include a local area network (LAN), wide area network (WAN), Internet, Intranet, wireless broadband or the like. Communication controller 38 may be employed to form a network interface for communicating with other information handling systems (not expressly shown) coupled to communication network 40.

In certain information handling system embodiments, expansion card controller 42 may also be included and is preferably coupled to PCI bus 25 as shown. Expansion card controller 42 is preferably coupled to a plurality of information handling system expansion slots 44. Expansion slots 44 may be configured to receive one or more computer components such as an expansion card (e.g., modems, fax cards, communications cards, and other input/output (I/O) devices).

Southbridge chipset 50, also called bus interface controller or expansion bus controller preferably couples PCI bus 25 to an expansion bus. In one embodiment, expansion bus may be configured as an Industry Standard Architecture ("ISA") bus. Other buses, for example, a Peripheral Component Interconnect ("PCI") bus, may also be used.

Interrupt request generator 46 is also preferably coupled to Southbridge chipset 50. Interrupt request generator 46 is preferably operable to issue an interrupt service request over a predetermined interrupt request line in response to receipt of a request to issue interrupt instruction from CPU 12. Southbridge chipset 50 preferably interfaces to one or more universal serial bus (USB) ports 52, CD-ROM (compact disk-read only memory) or digital versatile disk (DVD) drive 53, an integrated drive electronics (IDE) hard drive device (HDD) 54 and/or a floppy disk drive (ADD) 55. In one example embodiment, Southbridge chipset 50 interfaces with HDD 54 via an IDE bus (not expressly shown). Other disk drive devices (not expressly shown) which may be interfaced to Southbridge chipset 50 include a removable hard drive, a zip drive, a CD-RE (compact disk-read/write) drive, and a CD-DVD (compact disk-digital versatile disk) drive.

Real-time clock (RTC) 51 may also be coupled to Southbridge chipset 50. Inclusion of RTC 74 permits timed events or alarms to be activated in the information handling system 10. Real-time clock 74 may be programmed to generate an alarm signal at a predetermined time as well as to perform other operations.

I/O controller 48, often referred to as a super I/O controller, is also preferably coupled to Southbridge chipset 50. I/O controller 48 preferably interfaces to one or more parallel port 60, keyboard 62, device controller 64 operable to drive and interface with touch pad 66 and/or pointer 68, and PS/2 Port 70. FLASH memory or other nonvolatile memory may be used with I/O controller 48.

Generally, chipsets 24 and 50 may further include decode registers to coordinate the transfer of information between CPU 12 and a respective data bus and/or device. Because the number of decode registers available to chipset 24 or 50 may be limited, chipset 24 and/or 50 may increase the number or I/O decode ranges using system management interrupts (SMI) traps.

Figure 2:
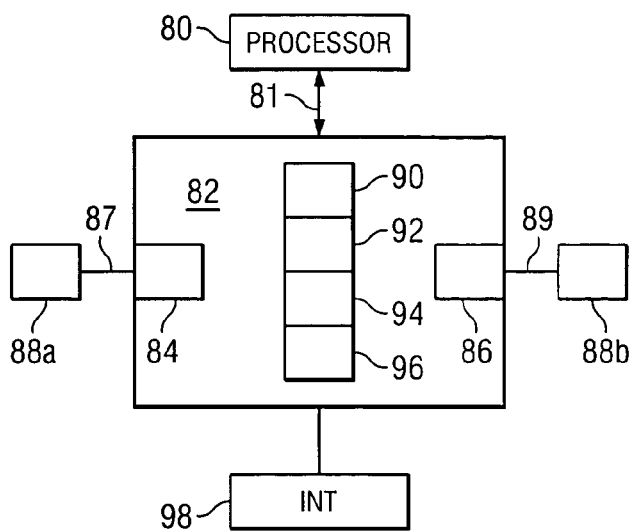
FIG. 2 illustrates an example embodiment of a chipset having decode registers forming a part of an information handling system, according to teachings of the present disclosure.

FIG. 2 illustrates an example embodiment of CPU 80 coupled to chipset 82 via bus 81. Generally, bus 81 is a positively decoded bus such as a low pin count bus (e.g., a PCI Express bus). In the example embodiment, chipset 82 includes decode registers 84 and 86 that are programmable to recognize a distinct I/O range for transferring information to respective computer devices 88a and 88b.

Chipset 82 may be formed on or coupled with substrate 75 such as a printed circuit board (not expressly shown). Typically, chipset 82 forms a part of a motherboard (not expressly shown) such as chipset 24 or 50 that are used in information handling system 10.

Generally, chipset 82 is used to route information to connected devices based on distinct I/O ranges stored in decode registers 84 and 86. Decode register 84 associated with chipset 82 allows for information to be passed to computer device 88a via bus 87. Similarly, decode register 86 permits information to be passed to computer device 88b via bus 89.

Typically, information sent from CPU 80 includes an I/O address such as a distinct I/O range to allow the information to be associated with a particular computer device to receive the information. The I/O address, once decoded, generally includes the I/O range for routing the information to the device. Thus, based on the I/O address, the information is passed to the corresponding bus for transmission to the respective device.

For example, information from CPU 80 may be directed to computer device 88a having a distinct I/O range of "CA0." If the decoded register for the information determines that the information includes the I/O range having the value of "CA0," the information will be directed to bus 87 for transmission to computer device 88a. This type of decoding is commonly known as positive decoding.

In the example embodiment, chipset 82 only has decode registers 84 and 86 for routing information to computer components that require distinct I/O ranges. Because additional computer devices may be associated or coupled to chipset 82 via a bus, additional decode registers are typically required.

In order to increase the quantity of decode ranges, chipset 82 may store one or more distinct I/O addresses or decode ranges in a memory location. For example, the memory location may include random access memory, Flash memory, non-volatile memory such as a hard disk drive or any other type of memory able to store the ranges. These stored decode ranges may be used to associate a decode register with an associated computer device on the bus to allow chipset 82 to route information to device. Because the devices connected to the bus may be varied, the stored decode ranges are able to be reprogrammed based on the current devices connected to the bus.

In some embodiments, additional decode registers may be stored in chipset 82 using stored decode registers 90, 92, 94 and 96. Each of the stored decode registers 90, 92, 94 and 96 may store a decode range for a particular computer device.

Chipset 82 typically uses positively decoding for determining the address of information sent along the bus. Because stored decode registers 90, 92, 94 and 96 are placed in memory, only decode registers 84 and 86 are used for routing information to respective computer devices on the bus. However, by using a system management interrupt (SMI) trap, stored decode registers 90, 92, 94 and 96 may be used to trigger a SMI. Thus, if chipset 82 receives information with an I/O address that matches one of stored decode registers 90, 92, 94 and 96, a SMI may be triggered to cause chipset 82 to reprogram at least one of decode register 84 or 86 to the received I/O address to allow the information to be routed to the respective computer device.

Interrupt 98 may also be communicated coupled with chipset 82. Based on the triggering of the SMI trap, interrupt 98 may generate a SMI. In some embodiments, the SMI is triggered on I/O accesses such as accessing an I/O address that is stored in stored decode registers 90, 92, 94 or 96.

Figure 3:
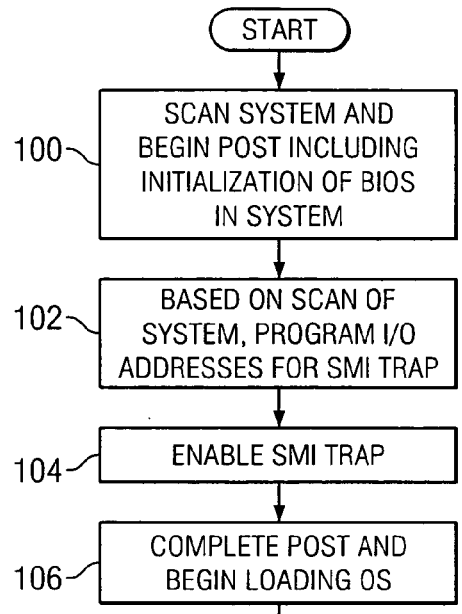
FIG. 3 is a flowchart for a method of setting system management interrupt (SMI) traps in an information handling system, according to teachings of the present disclosure.

FIG. 3 is a flowchart for a method of setting system management interrupt (SMI) traps in information handling system 10. At block 100, the method performs a scan of information handling system 10 for devices connected or coupled to the bus. Typically, the scan is performed during a power on self test (POST) operation or an initialization of the basic I/O system (BIOS) setup in which information handling system 10 establishes the number of computer devices placed on the bus.

During the post or the BIOS initialization, one or more chipsets may program decode ranges within distinct I/O ranges associated with computer devices. Because the number of devices requiring a distinct I/O range may exceed the number of available decode registers on the chipset, additional decode registers or decode ranges may be stored in memory such as stored decode registers 90, 92, 94 and 96.

For example, during a POST operation, information handling system 20 may program ranges of "CA0" into a first decode register and "A0" into a second decode register for routing information to a first and second computer device placed on the bus. Based on the system scan, additional decode ranges for additional computer devices may be stored in memory such as stored decode registers 90, 92, 94 and 96.

At block 102, information handling system 10 may be set up or programmed to generate a SMI upon accessing one of the additional decode ranges stored in memory. Generally, a SMI trap may be set up in a Trapped Cycle Register of a chipset (e.g., I/O controller hub). Upon accessing on the stored decode ranges in memory, the trapped cycle register may cause a SMI.

At block 104 the SMI trap is enabled. Typically, enabling a SMI trap is a process of setting a flag or status within the BIOS that causes information handling system 10 to recognize the I/O SMI trap set at block 102. Thus, once enabled, a SMI may be generated based on accessing one of the stored decode ranges in memory.

Following the set up (or programming) and enablement of the SMI trap, information handling system 10 may continue with the POST or start up operation including the loading of an operating system, as shown at block 106.

Figure 4:
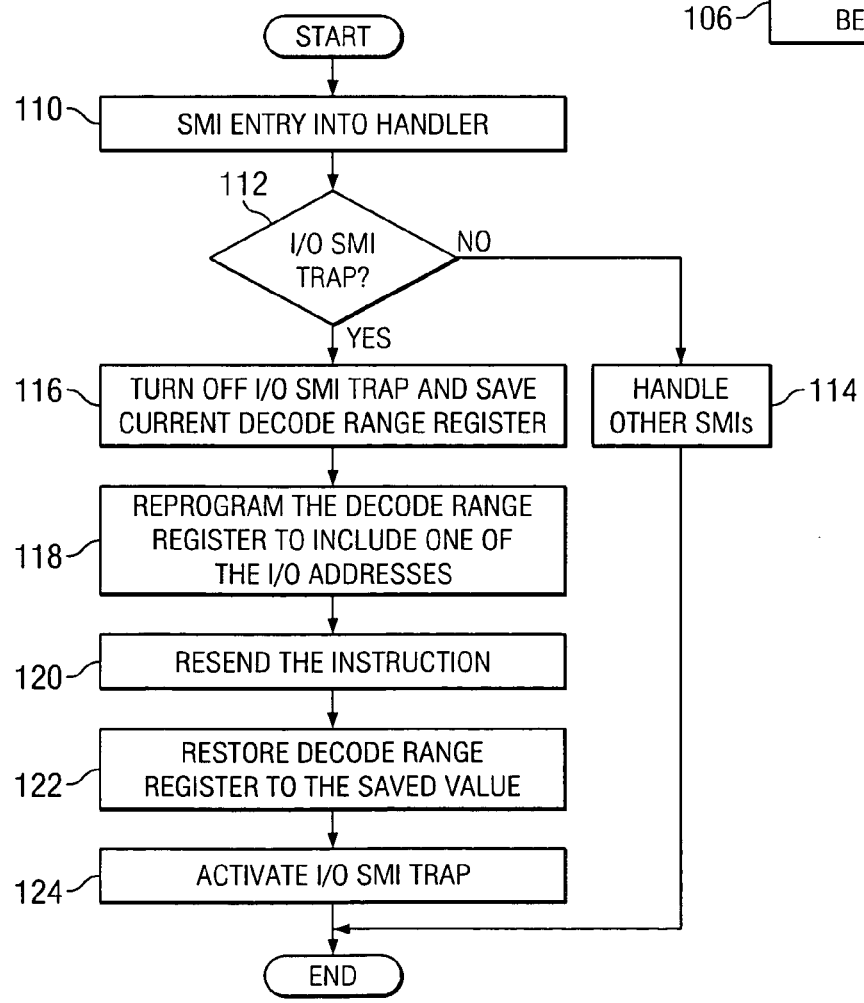
FIG. 4 is a flowchart for a method of increasing the quantity of input/output (I/O) decode registers using SMI traps in an information handling system, according to teachings of the present disclosure.

FIG. 4 is a flowchart for a method of increasing the quantity of input/output (I/O) decode registers using SMI traps in information handling system 10. At block 110, information handling system 10 enters into a handler such as a BIOS SMI handler. Generally, the SMI trap may have been triggered by accessing an I/O address stored in memory, which caused the entry into the handler.

Once entered into the handler, the handler determines whether the SMI was caused by the SMI trap set for accessing the I/O address, at block 112. Because SMIs may be caused from a variety of different operations within information handling system 10, the SMI handler determines whether the SMI was generated by the programmed I/O SMI trap based on accessing the I/O address stored in memory. If the SMI was not caused by the programmed I/O SMI trap, the method continues to block 114 and the SMI which caused the entry into the handler is handled.

However, if the SMI was determined to be caused by the programmed I/O SMI trap, the SMI handler may automatically disable the I/O SMI trap and save the current values of the I/O address of the decode registers in memory, as shown in block 116. The I/O SMI trap that was enabled during a set up operation such as the POST is now disabled such that additional I/O accesses to I/O address stored in memory does not cause a SMI.

The current I/O ranges are the distinct I/O addresses associated with computer devices on the bus. Because these I/O decode ranges may have been initially set during a POST operation, the I/O ranges are saved in memory. Typically, the current values of the I/O addresses are stored in a temporary memory storage. In one example embodiment, the decode ranges are stored in a register, namely the generic decode range register (e.g., the ICH_GEN_DEC register currently used with an Intel™ ICH6 chipset).

Once the current values of the I/O address are saved, the method proceeds to reprogram the decode range register to include at least one of the I/O address stored in memory, at block 118. Generally, the I/O address that triggered the I/O SMI trap to generate the SMI is copied from memory and programmed into one of the decode registers. Typically, the generic decode range register such as the ICH_GEN_DEC register is reprogrammed to include the I/O address in order to route information to the associated computer device.

With the reprogrammed generic decode range register, the system BIOS handler will cause a re-send of information that triggered the SMI, at block 120. Because the SMI trap is deactivated, another SMI is not generated. However, now that the I/O address is stored in a decode register, the chipset may decode and redirect the information to the associated computer device.

At block 122, the generic decode range register may be restored to the previously current decode value that has been saved in memory. Typically, the decode range register is reprogrammed back to the initial value as set during the POST operation.

At block 124, the SMI handler reactivates the I/O SMI trap. Because the decode range register is reprogrammed back to the original or initial value, information sent to I/O addresses stored in memory need to trigger the SMI trap to generate a SMI. Thus, the I/O SMI trap is re-activated to generate a SMI upon accessing an I/O addressed stored in memory. By deactivating and reactivating the SMI trap, the system may prevent an infinite loop caused by a SMI trap executing upon the re-send of the information to the chipset.

In some embodiments of the present disclosure, information handling system 10 may forward SmartVU codes to multiple busses so that PCI-Express, PCI-X and other non-compatible slots can be used to plug-in future SmartVU cards such as in a debugged card chipset. In performing this debug operation, information may be sent along the various buses by cycling through the decode ranges and the I/O address stored in memory such as in a broadcast fashion. As such, the information is repeatedly sent along each bus in an attempt to connect with or locate a particular computer device. The debug operation may further allow debugging programs to correctly locate an attached computer device.

Although the disclosed embodiments have been described in detail, it should be understood that various changes, substitutions and alterations can be made to the embodiments without departing from their spirit and scope.

What is claimed is:

1. A method of increasing the quantity of input/output (I/O) decode ranges in a chipset, comprising:
    generating a system management interrupt (SMI) based on information causing access to an I/O address that triggers a SMI trap, the I/O address operably received at the chipset via a bus;
    automatically reprogramming a decode register in the chipset to include the I/O address such that the chipset forwards the information to a device on the bus;
    automatically entering a SMI handler based on the generation of the SMI;
    upon entry into the SMI handler, deactivating the SMI trap and resending information that accesses the I/O address to allow the information to be forwarded to the device on the bus; and
    following the resend, re-activating the SMI trap.

2. The method of claim 1, further comprising programming a SMI trap in basic I/O system (BIOS) during an initialization process.

3. The method of claim 2, wherein the initialization process comprises a power on self test (POST) operation.

4. The method of claim 1, further comprising storing a current value of the decode register.

5. The method of claim 4, further comprising restoring the current value of the decode register after resending the information.

6. The method of claim 1, further comprising storing the I/O addresses that trigger a SMI trap in memory.

7. The method of claim 6, wherein reprogramming the decode register further comprises reprogramming the decode register to cycle through each decode register and I/O address stored in memory to send the information in a broadcast fashion along the bus.

8. The method of claim 1, further comprising positively decoding the I/O address.

9. An information handling system, comprising:
   a processor;
   a memory coupled to the processor;
   a chipset communicatively coupled to the processor and the memory such that the chipset operably receives input/output (I/O) address from the processor via a bus;
   the chipset including a decode register having at least one decode range, the decode range operable to route information to a computer device associated with the decode range;
   a stored decode register communicatively coupled to the chipset, the stored decode register operably stores an I/O address;
   a system management interrupt (SMI) trap operably set to generate a SMI, whereby during the SMI, a SMI handler reprograms the decode register to include at least one of the I/O addresses to allow the information to be forwarded to the respective computer device on the bus; and
   a system basic I/O system (BIOS) handler operable to cause the I/O address to be resent such that the I/O address is forwarded to the device on the bus.

10. The information handling system of claim 9, wherein the SMI trap comprises a trap set programmed in a Basic I/O system (BIOS).

11. The information handling system of claim 9, wherein the chipset comprises an I/O controller hub.

12. The information handling system of claim 9, wherein the bus is a low pin count bus.

13. A tangible computer-readable medium having computer-executable instructions for performing a method of increasing the quantity of input/output (I/O) decode ranges, comprising:
   programming a system management interrupt (SMI) trap in a basic I/O system (BIOS) to generate a SMI, the SMI trap operably triggered from information accessing an I/O address;
   upon generation of the SMI, saving a current value of a decode range register in memory and deactivating the SMI trap;
   automatically reprogramming a decode range register to include the I/O address;
   following the reprogramming of the decode range register, resending the information accessing the I/O address and restoring the decode range register to the current value; and
   re-activating the SMI trap.

14. The tangible computer-readable medium of claim 13, further comprising scanning an information handling system to determine the number of computer devices placed on a bus.

15. The tangible computer-readable medium of claim 14, further comprising, based on the scan, storing I/O addresses for the computer devices in memory.

16. The tangible computer-readable medium of claim 15, further comprising performing a debugging operation.

17. The tangible computer-readable medium of claim 16, wherein the debugging operation further comprises:
   repeating the programming of the decode range register for each I/O address stored in memory; and
   resending the information for each of the I/O addresses to allow the information to be sent to each device on the bus in a broadcast fashion.

* * * * *